(12) United States Patent
Zhang

(10) Patent No.: US 10,990,209 B2
(45) Date of Patent: Apr. 27, 2021

(54) TOUCH PANELS AND DISPLAY DEVICES

(71) Applicant: Yungu (Gu'an) Technology Co., Ltd., Hebei (CN)

(72) Inventor: Yapeng Zhang, Jiangsu (CN)

(73) Assignee: Yungu (Gu'an) Technology Co., Ltd., Hebei (CN)

( * ) Notice: Subject to any disclaimer, the term of this patent is extended or adjusted under 35 U.S.C. 154(b) by 0 days.

(21) Appl. No.: 16/462,044

(22) PCT Filed: Jul. 6, 2018

(86) PCT No.: PCT/CN2018/094908
§ 371 (c)(1),
(2) Date: May 17, 2019

(87) PCT Pub. No.: WO2019/105039
PCT Pub. Date: Jun. 6, 2019

(65) Prior Publication Data
US 2020/0285336 A1  Sep. 10, 2020

(30) Foreign Application Priority Data
Nov. 30, 2017  (CN) .......................... 201721643628.9

(51) Int. Cl.
*G06F 3/041* (2006.01)
*G06F 3/046* (2006.01)

(52) U.S. Cl.
CPC ............ *G06F 3/0412* (2013.01); *G06F 3/046* (2013.01)

(58) Field of Classification Search
None
See application file for complete search history.

(56) References Cited

U.S. PATENT DOCUMENTS

| 2010/0045614 | A1* | 2/2010 | Gray | G06F 3/044 345/173 |
| 2011/0057887 | A1* | 3/2011 | Lin | G06F 3/0443 345/173 |
| 2011/0141038 | A1* | 6/2011 | Kuo | G06F 3/0443 345/173 |
| 2012/0105343 | A1* | 5/2012 | Lee | G06F 3/0446 345/173 |
| 2012/0194474 | A1* | 8/2012 | Chang | G06F 3/044 345/174 |

(Continued)

FOREIGN PATENT DOCUMENTS

| CN | 103186306 A | 7/2013 |
| CN | 104951121 A | 9/2015 |

*Primary Examiner* — Matthew Yeung
(74) *Attorney, Agent, or Firm* — BakerHostetler

(57) ABSTRACT

Exemplary embodiments of the disclosure relate to display technology, and more particularly to touch panels and display devices, so as to improve the problem in the prior art of reflective effect caused by a too long metal bridge. A transparent conductive connection portion is arranged in the bridge unit, and the connection portion is connected to the adjacent second touch units by the metal bridges connected at both ends of the connection portion. Through this structural improvement of integrating a plurality of parts, the area of the metal bridges in the bridge unit can be reduced, the reflective image of the metal bridges due to external hard light can be reduced, thereby improving the display quality of the touch panel.

14 Claims, 4 Drawing Sheets

(56) References Cited

U.S. PATENT DOCUMENTS

2014/0204283 A1* 7/2014 Huh .................... G06F 3/0443
                                                      349/12
2015/0293634 A1   10/2015 Her et al.
2017/0235390 A1*  8/2017 Dong .................... G06F 3/044
                                                      345/173

* cited by examiner

US 10,990,209 B2

TOUCH PANELS AND DISPLAY DEVICES

CROSS-REFERENCE TO RELATED APPLICATIONS

This application is a continuation of International Application No. PCT/CN 2018/094908, filed on Jul. 6, 2018, which is based upon and claims priority to Chinese Patent Application No. 201721643628.9, filed on Nov. 30, 2017, the entire contents of which are incorporated herein by reference.

TECHNICAL FIELD

Exemplary embodiments of the disclosure relate to display technology, and more particularly to touch panels and display devices.

BACKGROUND

In the display technical field, touch screens have been widely used as a product for a purpose of interaction.

The touch display panel of the prior art includes a plurality of touch electrode patterns crosswise arranged, one touch electrode pattern is used as a drive electrode, and the other touch electrode pattern is matched as an inductive electrode. Since a metal bridge between adjacent inductive electrodes is relatively long, when it is irradiated by the external hard light, the metal bridge may reflect light, which causes an image phenomenon and affects the visual effect.

SUMMARY

Exemplary embodiments of the disclosure provide touch panels and display devices to improve the problem in the prior art of reflective effect caused by a too long metal bridge.

Exemplary embodiments of the disclosure adopt the following technical solutions:

A touch panel including:

a plurality of first touch electrode patterns arranged in a first direction, each of the first touch electrode patterns comprising a plurality of first touch units, and a connection unit connecting two adjacent first touch units; a plurality of second touch electrode patterns arranged in a second direction and intersected and insulated from the first touch electrode patterns, each of the second touch electrode patterns comprising a plurality of independent second touch units and at least one bridge unit connecting two adjacent second touch units; wherein the at least one bridge unit is arranged in a spacing channel formed between adjacent second touch units and comprises a transparent conductive connection portion and metal bridges; the connection unit connects the two adjacent second touch units by the metal bridges at both ends of the connection portion.

Optionally, the two adjacent second touch units are connected by two bridge units, the two adjacent second touch units corresponding to any one of the bridge units respectively have a recessed structure matched with a shape of the connection portion at the spacing channel, and the connection portion is connected to the corresponding second touch unit with a shortest distance by a metal bridge.

Optionally, the two bridge units have similar structure so that the bridge units at the spacing channels are symmetrically arranged.

Optionally, each of the connection units of the first touch electrode patterns has a convex structure matched with the recessed structure of the second touch units.

Optionally, the first touch electrode patterns are arranged in a same layer as the second touch units of the second touch electrode patterns.

Optionally, the bridge units are overlapped with and insulated from the connection units of the first touch electrode patterns in a different layer.

Optionally, the connection portions of the bridge units are arranged in a same layer as the connection units of the first touch electrode patterns, and are insulatively embedded in hollow structures of the connection units; the metal bridges are overlapped with and insulated with the connection units of the first touch electrode patterns in a different layer.

Optionally, a shape of the connection portion is selected from a group consisting of a diamond shape, a circle and a rectangle.

Optionally, when the shape of the connection portion is a diamond shape, the shape of the concave structure is a triangle.

Optionally, the shape of the convex structure matching the concave structure is a triangle.

Optionally, the material of the connection portion is indium tin oxide (ITO) or indium zinc oxide (IZO).

Optionally, the material of the metal bridge is any one of molybdenum, silver, titanium, copper, and aluminum.

A display device, including a touch panel having a plurality of first touch electrode patterns arranged in a first direction, each of the first touch electrode patterns comprising a plurality of first touch units, and a connection unit connecting two adjacent first touch units; a plurality of second touch electrode patterns arranged in a second direction and intersected and insulated from the first touch electrode patterns, each of the second touch electrode patterns comprising a plurality of independent second touch units and at least one bridge unit connecting two adjacent second touch units; wherein the at least one bridge unit is arranged in a spacing channel formed between adjacent second touch units and comprises a transparent conductive connection portion and metal bridges, the connection portion connects the two adjacent second touch units with the metal bridges at both ends of the connection portion.

The above at least one technical solution adopted by exemplary embodiments of the disclosure can achieve the following beneficial effects:

According to the above technical solutions, a transparent conductive connection portion is arranged in the bridge unit in the second touch electrode pattern, and the connection portion is connected to the adjacent second touch units by the metal bridges connected at both ends of the connection portion. Through this structural improvement of integrating a plurality of parts, the area of the metal bridges in the bridge unit can be reduced, the reflective image of the metal bridge due to external hard light can be reduced, thereby improving the display quality of the touch panel. Moreover, in the disclosure, it can be ensured by cooperation of the recessed structure and the convex structure that channel resistance in the spacing channel can't be excessively large, thereby ensuring the channel continuity and the drive effect.

DETAILED DESCRIPTION OF PREFERRED EMBODIMENTS

In order to make the objectives, the technical solutions and the advantages of the disclosure more clear, the technical solutions of the disclosure will be clearly and completely described in the following in conjunction with the specific embodiments of the disclosure and the corresponding drawings.

It should be noted that in the touch panel of the disclosure, in a second touch electrode pattern having a bridge unit, a spacing channel is formed between adjacent second touch units. It can be understood that the spacing channel has a certain channel distance, that is, the spacing distance between adjacent second touch units meets a certain threshold. In this way, it can be ensured that a channel resistance of the first touch units in the other direction which is crosswise arranged is not excessively large, and the drive effect is ensured.

Figure 1:
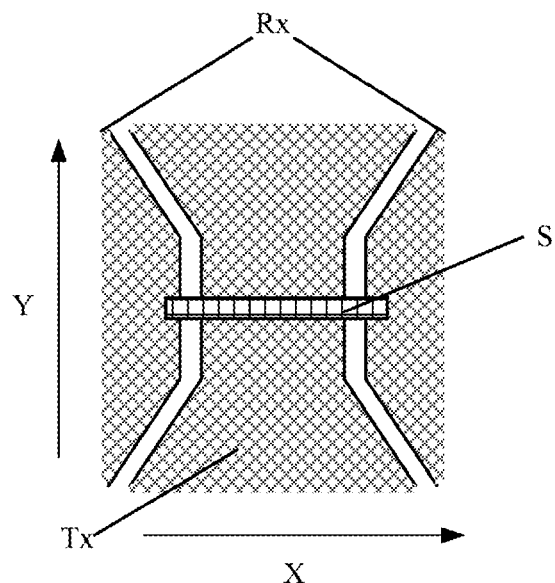
FIG. 1 is a schematic structural view showing a bridge structure of a touch display panel in the prior art.
Figure 2A:
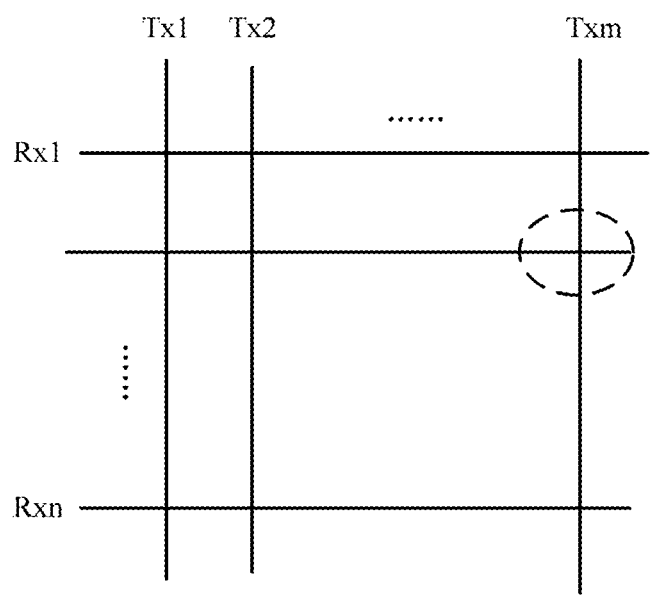
FIG. 2(a) and FIG. 2(b) are respectively a schematic structural view of a touch panel provided by the disclosure.
Figure 2B:
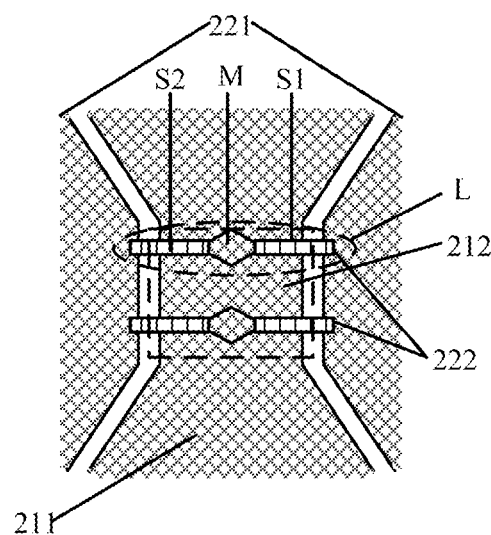

As shown in FIG. 2(a) and FIG. 2(b), FIG. 2(a) and FIG. 2(b) are respectively a schematic structural view of a touch panel provided by the disclosure, the touch panel mainly includes:

a plurality of first touch electrode patterns Tx (specifically including Tx1-Txm) arranged in a first direction, the first touch electrode patterns Tx include a plurality of first touch units 211, and a connection unit 212 connecting two adjacent first touch units;

a plurality of second touch electrode patterns Rx (specifically including Rx1-Rxn) arranged in a second direction and intersected and insulated from the first touch electrode patterns Tx. The second touch electrode patterns Rx include a plurality of independent second touch units 221 and at least one bridge unit 222 that connects the adjacent two second touch units 221.

The bridge unit 222 is arranged in a spacing channel formed between adjacent second touch units 221 (shown by a broken line in FIG. 2(b)). The bridge unit 222 includes a transparent conductive connection unit M and metal bridges (shown as S1 and S2, respectively, in FIG. 2). One end of the connection unit M is connected to one of the two adjacent second touch units 221 by the metal bridge S1, and the other end of the connection unit M is connected to the other one of the two adjacent second touch units 221 by the metal bridge S2. Thus the adjacent two second touch units 221 are connected. In the disclosure, the first direction may be the X-axis direction, the second direction may be the Y-axis direction, and the X-axis and the Y-axis may be perpendicular to each other. Correspondingly, it can be understood that the first touch electrode patterns may be drive electrodes, and it can also be understood that the second touch electrode patterns may be inductive electrodes; alternatively, the first touch electrode patterns may be inductive electrodes, and the second touch electrode patterns may be drive electrodes. Further, the disclosure may not be limited to such a structure with the first direction perpendicular to the second direction, and include a structure with the first direction and the second direction arranged at an arbitrary angle.

According to the above technical solution, at least one bridge unit is arranged in the second touch electrode patterns, and a transparent conductive connection portion is arranged in the bridge unit, and the connection portion is connected to the adjacent second touch units by the metal bridges connected at both ends of the connection portion. Through this structural improvement of integrating a plurality of parts, the area of the metal bridges can be reduced, the reflective image of the metal bridges due to external hard light can be reduced, thereby improving the display quality of the touch panel.

Optionally, in the disclosure, the two adjacent second touch units are connected by the two bridge units, and the two adjacent second touch units corresponding to any one of the bridge units respectively have a recessed structure matched with a shape of the connection unit at the spacing channel, and the connection portion is connected to the corresponding second touch unit with a shortest distance by a metal bridge.

Figure 3:
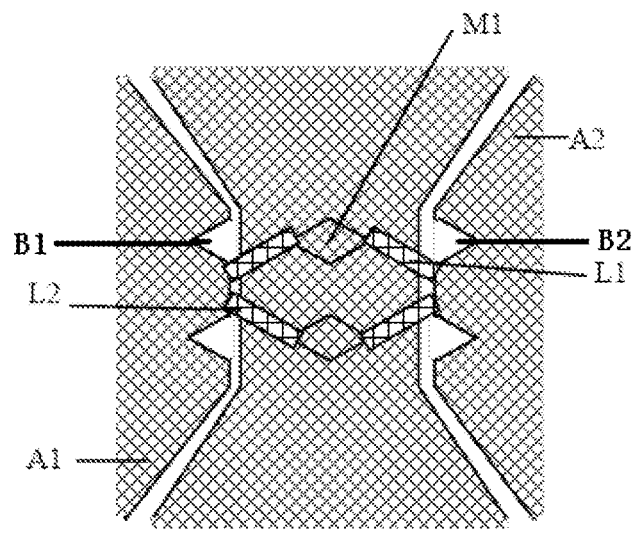
FIG. 3 is a second schematic structural view of a touch panel provided by the disclosure.

Referring to FIG. 3, in a preferred implementation, the first touch unit in the first direction is connected by the connection unit, and the second touch unit in the second direction is connected by the bridge unit. For the second touch unit A1 and the second touch unit A2 arranged adjacent to each other, two bridge units are arranged in the spacing channel formed by the second touch unit A1 and the second touch unit A2, which are a bridge unit L1 and a bridge unit L2, respectively. The second touch unit A1 and the second touch unit A2 respectively have a recessed structure matched with the shape of the connection portion M1 at the spacing channel corresponding to the bridge unit L1. Specifically, the connection portion M1 has a diamond shape. Correspondingly, a triangular recessed structure B1 is formed at an edge of the second touch unit A1 near the spacing channel, and a triangular recessed structure B2 is formed at an edge of the second touch unit A2 near the spacing channel. Therefore, it can be ensured by the recessed structure that the channel resistance of the first touch electrode patterns in the first direction within the spacing channel is not excessively large, thereby ensuring the channel continuity and the drive effect.

Alternatively, the bridge unit L2 may also be arranged in a similar structure to the bridge unit L1, so that the bridge units at the spacing channels are symmetrically arranged to ensure uniform continuity in the spacing channels.

Optionally, in the disclosure, each of the connection units of the first touch electrode patterns has a convex structure matched with the recessed structure of the second touch units. Specifically referring to FIG. 4, based on the structure shown in FIG. 3, the first touch unit A3 and the first touch unit A4 intersecting the second touch unit A1 and the second touch unit A2 are connected by the connection unit N. The connection unit N therein has convex structure B3 and convex structure B4 respectively matched with the recessed structure B1 and the recessed structure B2. Therefore, the convex structures are matched with the corresponding recessed structures, which can further ensure that the channel resistance of the first touch electrode pattern in the first direction within the spacing channel is not excessively large, thereby ensuring the channel continuity of the connection unit at the channel and the drive effect.

Optionally, the first touch electrode patterns are arranged in the same layer as the second touch units of the second touch electrode patterns. In order to simplify the manufacturing process, the first touch electrode patterns and the second touch units of the second touch electrode patterns arranged in the same layer may be formed simultaneously by coating-etching or direct evaporation.

Figure 5A:
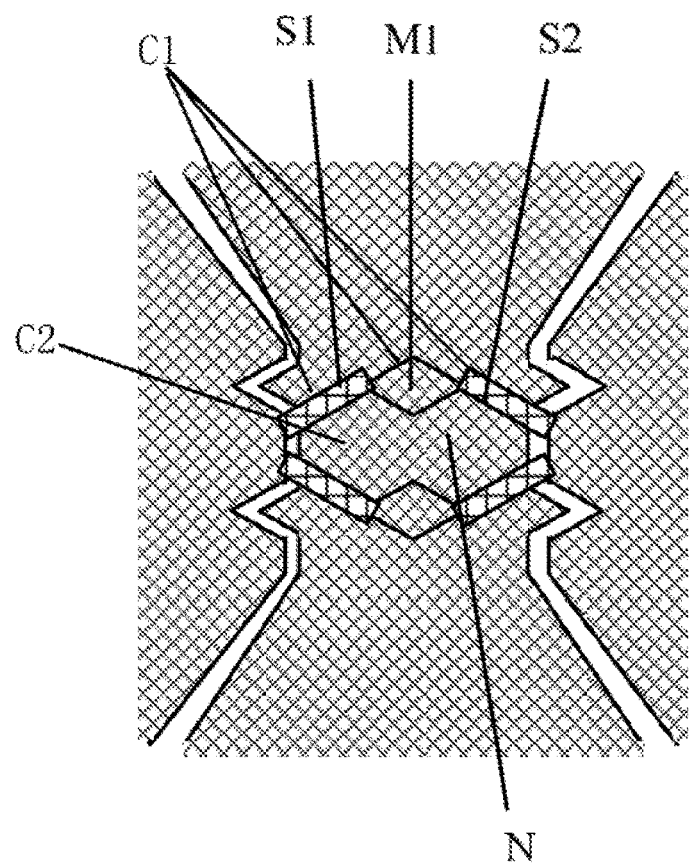
FIG. 5(a) and FIG. 5(b) are respectively schematic structural views of a touch panel provided by the disclosure.

Optionally, based on the structure of the first touch electrode patterns arranged in the same layer as the second touch units of the second touch electrode patterns, the connection portions in the second touch electrode patterns in the disclosure may have the following structures:

Structure 1: the bridge units are overlapped with and insulated from the connection units of the first touch electrode patterns in a different layer;

Specifically, as shown in FIG. 5(a), the connection portion M1 of the bridge unit is arranged in the same layer C1 as the metal bridge S1 and the metal bridge S2, and the connection portion M1, the metal bridge S1 and the metal bridge S2 are overlapped with the connection unit N of the first touch electrode pattern in a different layer C2. The overlapped regions are separated by an insulating layer. Further, in the overlapping region corresponding to the connection portion M1, the material of the insulating layer is provided as transparent insulating material.

Structure 2: the connection portions of the bridge units are arranged in the same layer C3 as the connection units of the first touch electrode patterns, and are insulatively embedded in hollow structures P of the connection units; the metal bridges are overlapped with and insulated with the connection units of the first touch electrode patterns in a different layer C4.

Figure 5B:
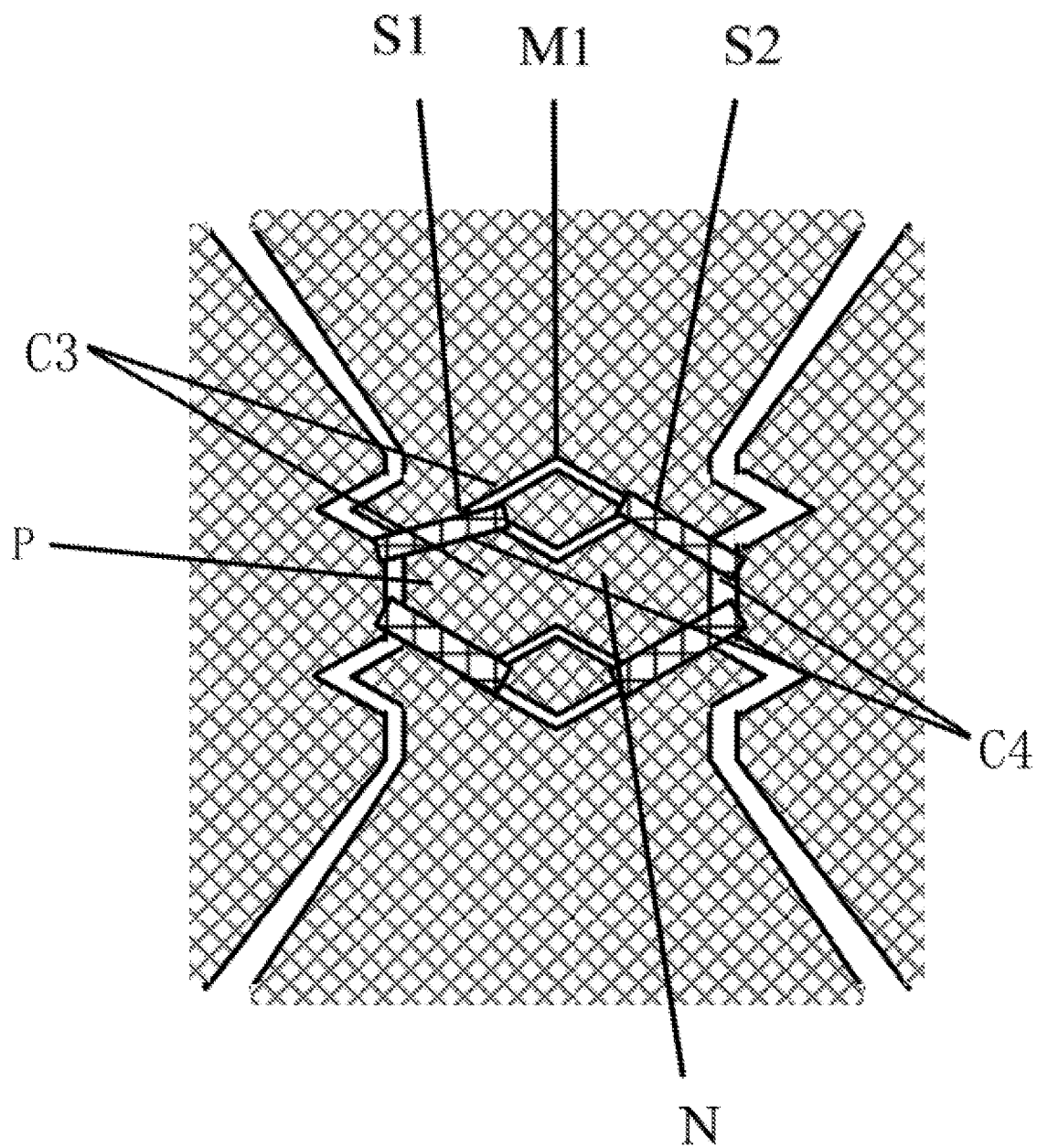

Specifically, as shown in FIG. 5(b), the connection portion M1 of the bridge unit is arranged in a different layer from the metal bridge S1 and the metal bridge S2, but is arranged in the same layer as the first touch electrode pattern or the second touch units of the second touch electrode pattern. The connection portion M1 is insulatively embedded in the hollow structure of the connection unit N of the first touch unit A3 and the first touch unit A4. One end of the metal bridge S1 is overlapped with the connection portion M1, and the other end is overlapped with the second touch unit A1. One end of the metal bridge S2 is overlapped with the connection portion M1, and the other end is overlapped with the second touch unit A2. Therefore, the second touch unit A1 and the second touch unit A2 are connected to each other by the metal bridge S1, the metal bridge S2, and the connection portion M1. Further, the overlapped regions of the metal bridge S1 and the metal bridge S2 and the connection unit N are provided with an insulating layer.

In the above structure 1 and structure 2, a part of the metal bridge is replaced by a transparent conductive connection portion, thus the area of the metal bridge in the bridge structure can be reduced, the image phenomenon caused by the reflection of the metal bridge during display can be improved, and the display quality can be improved.

Figure 4:
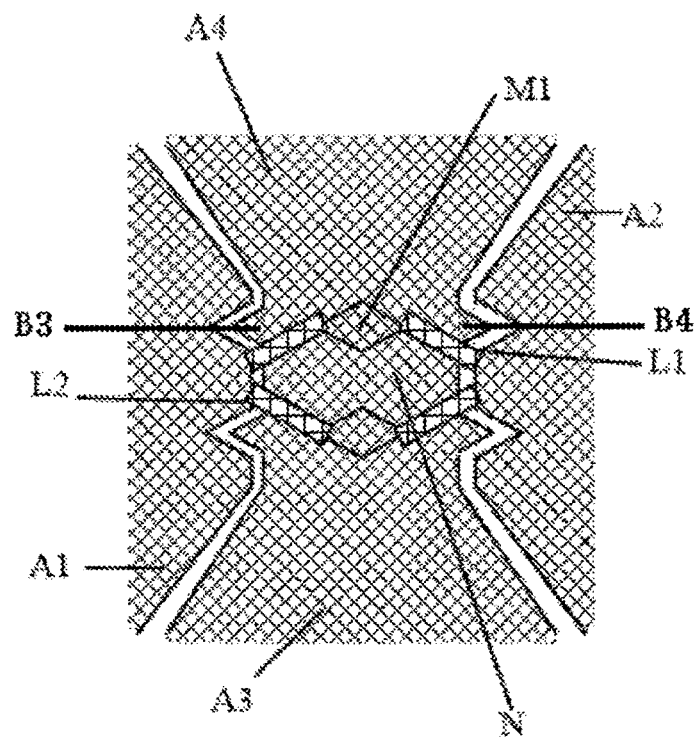
FIG. 4 is a third schematic structural view of a touch panel provided by the disclosure.

Alternatively, in the disclosure, the shape of the connection portion M1 is a diamond shape or a circle or a rectangle. In a preferred implementation, as shown in FIG. 4, the shape of the connection portion M1 is a diamond shape, the shape of the concave structures B1, B2 is a triangle, and the shape of the convex structures B3, B4 matching the concave structures B1, B2 is a triangle.

Optionally, the material of the connection portion is indium tin oxide (ITO) or indium zinc oxide (IZO). The material of the metal bridge is any one of molybdenum, silver, titanium, copper, and aluminum.

In addition, the disclosure further provides a display device, including the above touch display panel. Further, the display device may be any product or component which has a display function, such as a mobile phone, a tablet computer, a television, a display, a notebook computer, a digital photo frame, a navigator, a smart wearable device and etc. It can be understood by those skilled in the art that there can be other indispensable components of the display device, and are not described herein, nor should they be construed as a limitation to the disclosure.

What is claimed is:

1. A touch panel comprising:
a plurality of first touch electrode patterns arranged in a first direction, each of the first touch electrode patterns comprising a plurality of first touch units, and a connection unit connecting two adjacent first touch units;
a plurality of second touch electrode patterns arranged in a second direction and intersected and insulated from the first touch electrode patterns, each of the second touch electrode patterns comprising a plurality of independent second touch units and at least one bridge unit connecting two adjacent second touch units;
wherein the at least one bridge unit is arranged in a spacing channel formed between adjacent second touch units and comprises a transparent conductive connection portion and two metal bridges,
wherein the connection portion connects the two adjacent second touch units via the metal bridges, which are formed at both ends of the connection portion;
wherein each of the two adjacent second touch units has a recessed structure at an edge near the spacing channel;
wherein the recessed structure matches with a shape of the connection portion;
wherein the shape of the connection portion is a diamond shape, a shape of a concave structure being a triangle; and
wherein each of the connection units of the first touch electrode patterns has a convex structure, a shape of the convex structure matching the concave structure being a triangle.

2. The touch panel according to claim 1, wherein:
the two adjacent second touch units are connected by two bridge units, and
the connection portion is connected to the corresponding second touch unit with a shortest distance by the metal bridge.

3. The touch panel according to claim 2, wherein the bridge units at the spacing channels are symmetrically arranged.

4. The touch panel according to claim 1, wherein each of the connection units of the first touch electrode patterns has a convex structure matched with the recessed structure of the second touch units.

5. The touch panel according to claim 1, wherein the first touch electrode patterns are arranged in a same layer as the second touch units of the second touch electrode patterns.

6. The touch panel according to claim 5, wherein the bridge units are overlapped with and insulated from the connection units of the first touch electrode patterns in a different layer.

7. The touch panel according to claim 5, wherein:
the connection units have hollow structures;
the connection portions of the bridge units are arranged in a same layer as the connection units of the first touch electrode patterns, and are insulatively embedded in the hollow structures; and
the metal bridges are overlapped with and insulated with the connection units of the first touch electrode patterns in a different layer.

8. The touch panel according to claim 1, wherein the material of the connection portion is indium tin oxide or indium zinc oxide.

9. The touch panel according to claim 1, wherein the material of the metal bridge is any one of molybdenum, silver, titanium, copper, and aluminum.

10. The touch panel according to claim 1, wherein two recessed structures are defined at opposite sides of each of the at least one bridge unit.

11. The touch panel according to claim 10, wherein the two recessed structures are arranged symmetrically.

12. The touch panel according to claim 10, wherein:
each of the connection units of the first touch electrode patterns has a plurality of convex structures, and
an amount of the convex structures is equal to an amount of the recessed structures.

13. The touch panel according to claim 1, wherein:
the shape of the connection portion is a diamond shape having four vertexes,
one of the two metal bridges is connected with a first vertex of the four vertexes,
the other one of the two metal bridges is connected with a second vertex of the four vertexes, and
both the first vertex and the second vertex are vertexes on a same diagonal line.

14. The touch panel according to claim 1, wherein:
the shape of the connection portion is a rectangle having four vertexes,
one of the two metal bridges is connected with a first vertex of the four vertexes,
the other one of the two metal bridges is connected with a second vertex of the four vertexes, and
both the first vertex and the second vertex are vertexes on a same diagonal line.

* * * * *